May 16, 1933. L. W. THOMPSON 1,909,137
REGULATING SYSTEM
Filed Jan. 18, 1930
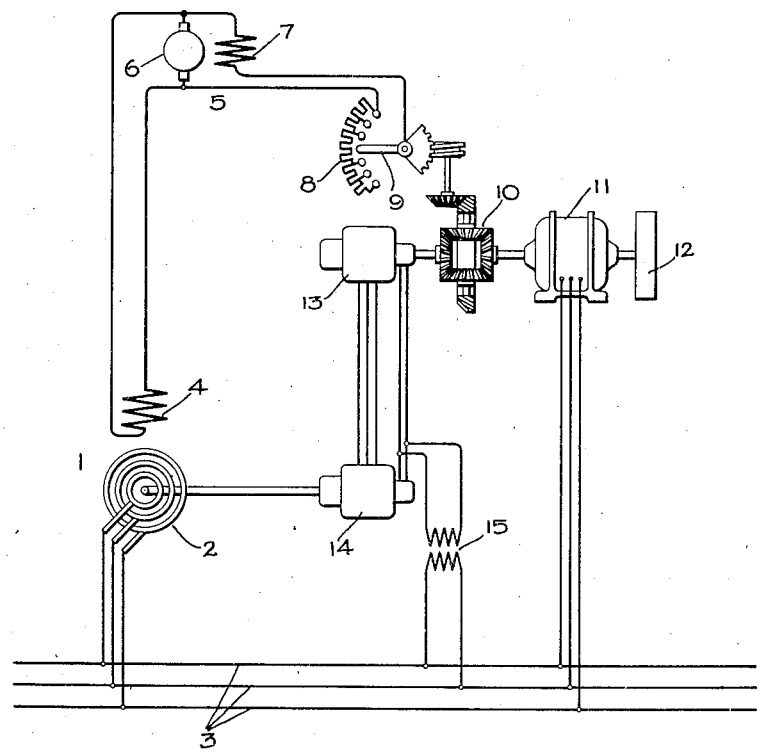
Inventor:
Louis W. Thompson,
by Charles E. Tullar
His Attorney.

Patented May 16, 1933

1,909,137

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING SYSTEM

Application filed January 18, 1930. Serial No. 421,835.

My invention relates to electrical regulating systems and more particularly to the regulation of the stability of synchronous electrical apparatus.

The problem of stability and power limits of distribution and transmission systems involving synchronous machinery has become increasingly important in recent years for the reason that economic considerations render it desirable, if not necessary, to operate the equipment at or near these limits if long lines and so-called superpower networks are to be able to compete successfully with locally generated power. However, with a single exception there is no fundamental difference between the problem of stability in systems including very long lines and the same problem in any other system, it being only that in the former economic conditions have made the problem acute. The exception mentioned is that the comparatively high charging current of long lines, due to the fact that they must operate at higher voltages in order to keep down resistance losses, results in a higher power factor and consequently in a relatively lower excitation of the synchronous machines than is ordinarily the case.

The torque at which synchronous machines fall out of step depends upon the flux linkages in them, or in other words, upon their excitation. However, the excitation at any given load is fixed by the voltage and the power factor of the system. Thus, if there is no automatic means for regulating the excitation, a sudden application of load may cause a synchronous machine to break out of step, although the total load is considerably less than the machine can actually carry at maximum excitation and it may even be less than the machine can carry at that particular excitation if the increase in load had been applied very gradually. This action may be explained by comparing the electromagnetic bond between the rotor and stator of the machine to an elastic band, which is supporting a weight representing the initial load on the machine. If an additional weight, which corresponds to the increase in load, is suddenly applied the elastic will stretch and the weights will descend beyond the position they will occupy when equilibrium is finally established. If the added weight is applied suddenly enough and if it is large enough, the initial stretching of the elastic may break it, whereas if the same weight is applied gradually, the elastic will not break. This analogy, however, is not perfect because of the fact that synchronous machines tend to "stiffen" when the load is suddenly applied to them, the "stiffening" being due to the fact that the sudden increase in armature current induces a transient current in the field winding, which aids the already existing field current. The analogy must therefore be modified to the extent that as the added weight is suddenly applied the elastic tends to stiffen. However, it will still be stretched more than if the change in weight were gradual.

If the excitation of a synchronous machine can be increased as rapidly as the load is applied the machine will become much more stable for the increase in excitation increases the strength of the electromagnetic bond between the rotor and stator and checks the tendency of the machine to swing out of step. Voltage regulators do this to a certain extent due to the fact that the stable portions of the voltage characteristic of synchronous machines is a drooping characteristic. I propose, however, to regulate the excitation of synchronous machines directly in response to the angular displacement of the machines as a result of load changes thereon.

It is an object of my invention to provide a new and improved regulating system for synchronous machines.

It is a further object of my invention to provide a system for regulating the excitation of synchronous machinery directly in response to the angular displacement of said machines.

My invention will be better understood from the following description taken in connection with the accompanying drawing and its scope will be pointed out in the appended claims.

Referring now to the single figure of the drawing, which is a diagrammatic illustration of my invention, 1 is a synchronous machine, which may be either an alternator or a synchronous motor, having an armature 2 connected to a circuit 3 and a field winding 4 connected across the terminals of an exciter 5. Exciter 5 has an armature 6 and a shunt field winding 7, in whose circuit is a variable field resistance 8. Arranged to vary the amount of resistance 8 is a pivoted arm 9, which is connected by a suitable mechanism, as shown, to a differential 10. Also connected to differential 10 is a synchronous motor 11, which is electrically connected to circuit 3. This motor is equipped with a heavy flywheel 12 so that the moment of inertia of its rotating parts is great compared with the electromagnetic forces acting upon the rotor. As a result motor 11 will be substantially insensitive to current and voltage surges on circuit 3. Also connected to differential 10 is a so-called self-synchronous motor 13 which is electrically connected to a similar machine 14, the latter being mechanically coupled to the rotor of synchronous machine 1. The alternating current field excitation for machines 13 and 14 is supplied from one of the phases of circuit 3 through a suitable transformer 15. The operation of machines 13 and 14 is so well understood in the art that a detailed description of their principle of operation is deemed unnecessary. They are employed merely to provide convenient means for obtaining at a distance a rotary motion which is proportional to that of the rotor of machine 1, and it will readily occur to those skilled in the art that any other equivalent means such as sprockets and chains or geared shafting might equally well be employed without departing from my invention in its broader aspects. In fact, if desired, the rotor of machine 1 might be directly connected to differential 10, although it will usually be found more desirable to position the differential more or less remotely from machine 1.

The operation of my system is as follows. Machine 11 is designed to operate at the same average speed as machine 13, which may or may not operate at the same speed as machine 14, the only important consideration being that the two gears driven by machines 11 and 13 respectively should operate under normal conditions at the same speed. Machine 11 is also connected so that it rotates in the opposite direction from that of machine 13. As a result, under normal conditions the arm 9 will be stationary. If now, a load is suddenly applied to machine 1 its speed will momentarily change with the result that the gear of the differential driven by motor 13 would also momentarily change its speed with the result that arm 9 will move an amount which is proportional to the momentary change in speed or angular position of machine 1. Arm 9 is so connected to differential 10 that upon an increase in load on machine 1 it will tend to move so as to decrease the amount of resistance 8 in series with exciter field winding 7, thereby raising its voltage and consequently the excitation of machine 1, with the result that the tendency of machine 1 to break out of step is greatly minimized. The sudden loading or unloading of machine 1 with its attendant angular displacement of this machine produces both current and voltage disturbances on line 3 which would ordinarily tend to produce sympathetic changes in the angular displacement of machine 11. However, due to its high moment of inertia this machine is substantially insensitive to the surges with the result that its instantaneous speed does not vary appreciably.

Thus, assuming that machine 1 is an alternator, machine 13 will be arranged so as to turn in a clockwise direction, as viewed from its left end, while motor 11 will be connected to turn in the opposite direction. The sudden application of load on machine 1, which is equivalent to a tendency of the prime mover which drives this machine to increase its speed provided the prime mover is of large enough capacity, will therefore result in an increase in the angle of the lead between the field of the rotor and stator, or in other words, to a momentary increase in the instantaneous speed. As a result there will be a momentary increase in speed of machine 13 over that of machine 11, which has not changed its angular position. The result of this will be to cause contact arm 9 to move in such a direction as to decrease the resistance in the field circuit of exciter 5, thereby increasing the excitation of machine 1 and counteracting any tendency for this machine to break out of step.

While I have shown and described a particular embodiment of my invention it will be obvious to those skilled in the art that changes and modifications may be made without departing from my invention, and I, therefore aim in the appended claims to cover all such changes and modifications as fall within the true spirit and scope of my invention.

What I claim as new and desire to secure by Letters Patent of the United States is:

1. In a system for regulating the stability of a synchronous machine, in combination, an alternating current circuit, a synchronous machine connected thereto, a source of substantially constant speed angular rotation, and means responsive to the angular relation of the rotatable element of said synchronous machine and said source for varying the field excitation of said synchronous machine in proportion to said angular relation.

2. In combination, an alternating current circuit, a pair of synchronous machines connected to said circuit, one of said machines having a comparatively large moment of inertia with respect to the electromagnetic forces acting on it, and means responsive to the angular relation of the rotor elements of said machines for varying the excitation of the other machine in proportion to said angular relation.

3. In a regulating system, in combination, an alternating current circuit, a pair of synchronous machines connected to said circuit, the ratio of the moment of inertia of the rotating elements associated with one of the machines and the electromagnetic forces acting in said machine being so much greater as to be of a different order of magnitude from the similar ratio for the other machine, movable means for varying the excitation of said other machine, and means responsive to the phase angle relation of said machines for operating said movable means to vary the excitation of the other machine in proportion to said angular relation.

4. In a regulating system, in combination, an alternating current circuit, a variable load synchronous machine connected to said circuit, a synchronous motor connected to said circuit, the moment of inertia of the rotating elements of said motor being abnormally high with respect to the electromagnetic forces acting on them, and means responsive to the phase angle relation of the rotors of said synchronous machine and said synchronous motor, for increasing the excitation of the latter in proportion to said phase angle relation.

5. In a regulating system, in combination an alternating current circuit, a synchronous machine connected to said circuit, a synchronous motor connected to said circuit, a flywheel having a large moment of inertia connected to the shaft of said synchronous motor, means connecting together the shafts of said synchronous machine and said synchronous motor, and means associated with said connecting means for varying the excitation of said synchronous machine in proportion to the phase angle relation of said shafts.

6. In a regulating system, in combination, a three phase circuit, a three phase alternator connected thereto, a three phase synchronous motor connected thereto, the rotor of said synchronous motor having an abnormally high moment of inertia with respect to the electromagnetic forces acting upon it, a differential mechanism connecting together the shafts of said alternator and of said motor, and means associated with said differential mechanism for varying the excitation of said alternator in proportion to the relative phase angle of the rotor elements of said alternator and said motor.

In witness whereof, I have hereunto set my hand this 17th day of January, 1930.

LOUIS W. THOMPSON.